United States Patent [19]
Sawamoto et al.

[11] Patent Number: 5,290,406
[45] Date of Patent: Mar. 1, 1994

[54] METHOD FOR PRODUCING OZONE

[75] Inventors: Isao Sawamoto, Kanagawa; Takayuki Shimamune, Tokyo; Yoshinori Nishiki, Kanagawa, all of Japan

[73] Assignee: Permelec Electrode Ltd., Kanagawa, Japan

[21] Appl. No.: 899,306

[22] Filed: Jun. 16, 1992

[30] Foreign Application Priority Data

Jun. 17, 1991 [JP] Japan .................................. 3-171768

[51] Int. Cl.$^5$ ................................................ C25B 1/00
[52] U.S. Cl. ...................................... 204/101; 204/128; 204/129
[58] Field of Search ........................ 204/129, 101, 128; 423/240 R, 241; C25B 1/00

[56] References Cited

U.S. PATENT DOCUMENTS 4,416,747 11/1983 Menth et al. ........................ 204/129

FOREIGN PATENT DOCUMENTS 2221423 9/1987 Japan .................................. 423/240
3-020488 1/1991 Japan ............................ C25B 11/20

Primary Examiner—Kathryn Gorgos
Attorney, Agent, or Firm—Sughrue, Mion, Zinn, Macpeak & Seas

[57] ABSTRACT

A method for producing ozone which comprises electrolyzing water using a fluororesin-type ion-exchange membrane as a solid electrolyte thereby to generate an ozone-containing gas, and cooling the gas thereby to remove a fluorine-containing substance present in the gas generated.

2 Claims, 1 Drawing Sheet

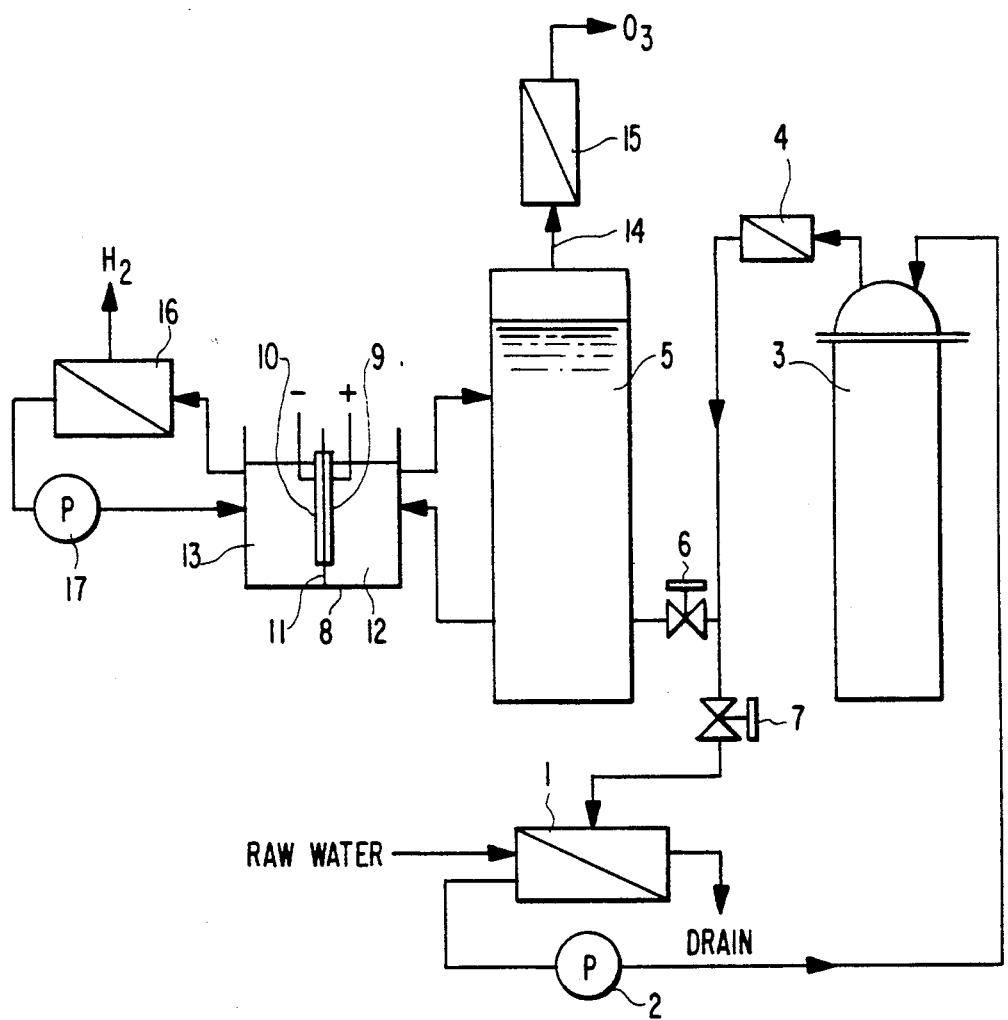

METHOD FOR PRODUCING OZONE

FIELD OF THE INVENTION

The present invention relates to a method for producing an ozone-containing gas by electrolysis of water using a solid electrolyte. More particularly, this invention relates to a method for producing a high-purity ozone-containing gas, which comprises electrolyzing water using a fluororesin-type ion-exchange membrane as a solid electrolyte thereby to generate an ozone-containing gas and removing, by a simple technique, fluorine-containing substances that contaminate the electrolytically evolved gas and are mainly ascribable to the fluororesin-type ion-exchange membrane.

BACKGROUND OF THE INVENTION

High-purity pure water (so-called ultrapure water) from which impurities have been removed to a high degree and which are used in semiconductor production, biotechnology, and other applications has reached a level of extremely high purity as a result of recent advances in ion exchange resin treatments or distillation techniques. At present, the electrical resistivity of high-purity pure water is close to 18 MΩ/cm, i.e., a state in which almost no free ions are present in the water. However, even pure water having such a high degree of purity contains the dead cells of microorganisms, such as bacteria, and nonionic substances. These remaining impurities in the water are impossible to remove by an ion exchange method or distillation method, and contaminants such as these are an obstacle to further improving water purity. The amount of impurities which ultrapure water can contain is gradually becoming more restrictive, and present-day ultrapure water must contain less than 10 contaminant particles per milliliter (ml) with a size of 0.07 μm or larger.

On the other hand, ozone is attracting attention as a powerful and clean oxidizing agent. The use of ozone, particularly for water treatment, is increasing since treatment with ozone is advantageous. For example, no residual substances are left in the treated water unlike conventionally employed chlorine-containing oxidizing agents. The lack of a residual substances is because the product of ozone decomposition is oxygen, and the decomposition rate of ozone is so high that ozone itself does not remain in the treated water. Hence, there are no problems of secondary pollution.

To improve the purity of ultrapure water, ozone treatment is performed preferably in combination with an ion exchange method or a distillation method. In conducting ozone treatment of water for producing ultrapure water having an improved purity, contamination of the water due to the ozone gas itself supplied for the treatment should be avoided.

For evolving gases containing ozone which is a useful oxidizing agent as described above, an electrical discharge method and an electrolytic method have been primarily employed conventionally. However, the electrolytic method is used typically because of its advantages of product purity and operational efficiency.

The electrolytic method, when carried out using a fluororesin-type ion-exchange membrane as a solid electrolyte, is capable of producing an ozone-containing gas having a far higher purity and ozone concentration as compared with the electrical discharge method. However, it was recently found that a slight amount of fluorine-containing substances is present in the ozone-containing gas generated by such an electrolytic method. This phenomenon had not been observed until recently and, hence, no method for removing such contaminants is presently known.

SUMMARY OF THE INVENTION

An object of the present invention is to provide a method for producing high-purity ozone which can be used to produce ultrapure water which is used for electronic circuit cleaning and similar applications, thereby to eliminate the above-described problem; in the production of such ultrapure water, use of high-purity ozone is necessary.

The method for producing ozone according to the present invention comprises electrolyzing water using a fluororesin-type ion-exchange membrane as a solid electrolyte thereby to generate an ozone-containing gas, the gas generated being cooled thereby to remove fluorine-containing substances present in the gas.

BRIEF DESCRIPTION OF THE DRAWING

The FIGURE is a flowchart illustrating one embodiment of the ozone production method according to the present invention.

DETAILED DESCRIPTION OF THE INVENTION

The ozone production method of the present invention involves efficiently removing fluorine-containing substances and mist particles that contaminate an ozone-containing gas electrolytically generated using a fluororesin-type ion-exchange membrane from the ozone-containing gas by a very simple operation, i.e., by cooling the gas.

Since the method of the present invention is especially advantageous for the production of a high-purity ozone-containing gas, the purity of the water to be used as a raw material for electrolysis should be increased as much as possible and inclusion of impurities into the water should be avoided. In the case of using tap water as the water used as a starting material, the tap water desirably is contacted with an ion-exchange resin or the like to remove impurities present therein and to thereby reduce the electrical conductivity of the tap water from around 150 μS/cm for ordinary tap water to around 1 μS/cm. In this case, the purification of tap water may be conducted while measuring the electrical conductivity of the purified water with a sensor or other means so that only purified water which has an electrical conductivity not higher than predetermined level is used for electrolysis.

According to the method of the present invention, the starting material water which has thus been made to have a low electrical conductivity and to be substantially free from impurities is fed to an electrolytic cell, specifically to either or both of an anode chamber and a cathode chamber, in which the cell has been partitioned with a solid electrolyte comprising a fluororesin-type ion-exchange membrane, and electrolysis of the water is conducted to generate an ozone-containing gas having an ozone gas concentration of from 10 to 20% by weight in the anode chamber.

A perfluorocarbonsulfonic acid or perfluorocarboncarboxylic acid cation- or anion-exchange membrane or other type of membrane can be employed as the fluororesin-type ion-exchange membrane used as a solid electrolyte. This solid electrolyte is sandwiched between two electrodes one of which comprises, for example, lead dioxide as an anode active material and the other of which comprises, for example, platinum or carbon as a cathode active material. Electrolysis is performed by applying an electric current such that the lead dioxide when it is used as an anode is positively polarized and the platinum or carbon when used as a cathode is negatively polarized, while feeding the starting water having a low electrical conductivity and free from impurities. Like ordinary solid electrolytes, the fluororesin-type ion-exchange membrane used as a solid electrolyte in this invention can be directly covered on both sides with the electrode active materials so as to unite the electrode materials with the solid electrolyte.

The electrolysis is carried out under appropriately selected conditions. However, it is preferred to perform the electrolysis at a current density of from 10 to 20 $A/dm^2$ and at a cell temperature of from 10° to 50° C. from the standpoints of ozone concentration and electric power efficiency.

As a result of the electrolysis, an ozone-containing gas is evolved in the anode chamber of the electrolytic cell. In the anode chamber, this ozone-containing gas, which is a gaseous mixture of oxygen gas and from 10 to 20% by weight of ozone gas, coexists with the anolyte and is, hence, in a gas-liquid mixed state. This gas-liquid mixture is circulated to an ozone-containing gas separator, where gas-liquid separation is conducted to separate the ozone-containing gas from the anolyte. The resulting ozone-containing gas is removed from the electrolysis system, while the anolyte from which the ozone-containing gas has been separated is circulated back to the anode chamber.

The thus-separated ozone-containing gas contains a slight amount of fluorine-containing substances. Since the amount of such fluorine-containing substances present in the ozone-containing gas increases as the ozone concentration in the ozone-containing gas increases, it is presumed that the generation of the fluorine-containing substances is attributable to decomposition by ozone of the surfaces of the fluororesin materials present in the ion-exchange membrane. The ozone-containing gas further contains water vapor in an amount corresponding to the saturation amount at the gas evolution temperature and also contains a slight amount of water as a mist.

The amount of fluorine-containing substances, mist particles, and the like which contaminate the ozone-containing gas is so slight that the gas can be used directly in ordinary ozone treatment without posing any problem, and the ion-exchange membrane can be used over a period of one year or more without replacement with a fresh membrane. However, where the ozone-containing gas is used in applications where high purity is required, e.g., in ultrapure water production, there is the possibility that inclusion of these impurities might be a serious problem.

The present inventors have found that by cooling the ozone-containing gas containing fluorine-containing substances, for example, to 25° C. or less, preferably 20° C. or less, the fluorine-containing substances can be removed from the ozone-containing gas substantially completely. The lower limit for cooling is not particularly limited, and can be freely determined. Although the mechanism of this removal has not been elucidated, it is presumed that the fluorine-containing substances mainly comprise hydrogen fluoride (boiling point: 19.54° C.) and the hydrogen fluoride liquefies and separates from the ozone-containing gas upon cooling.

Cooling the ozone-containing gas to remove fluorine-containing substances and mist particles is conducted after the gas has undergone gas-liquid separation from the anolyte. The cooler may be disposed in a line through which the ozone-containing gas to be cooled flows, and the cooler may have any construction so long as the ozone-containing gas is cooled. To conduct the cooling of the ozone-containing gas without contamination of the gas by contact with the cooler used, it is preferred for the cooler to be made of titanium, quartz glass, or an extremely stable fluororesin such as polytetrafluoroethylene (PTFE).

For the cooling treatment of the ozone-containing gas, a filter may also be disposed along with the cooler. Use of such a filter enables removal of not only mist particles but also condensed water vapor resulting from the cooling. Preferably, the filter is installed next to the outlet part of the cooler. This filter can be made of any material without particular limitation so long as it does not cause any contamination of the liquid electrolyte or the ozone-containing gas to occur. However, use of a nonwoven cloth made of a fluororesin which itself is stable and is resistant to ozone especially, a highly stable PTFE or the like, is advantageous in that due to the hydrophobicity of such a material, not only the mist particles and water droplets can be removed substantially completely even when the filter has a large pore diameter, but use of this filter results in almost no pressure loss. Filters made of other materials can be also used.

According to the ozone production method described above, fluorine-containing substances which form due to the use of the fluororesin-type ion-exchange membrane as a solid electrolyte and which contaminate the ozone-containing gas can be removed by a simple operation of cooling the gas and, in addition, mist particles can also be removed considerably. As a result, a high-purity ozone-containing gas having a very small amount of impurities which can be suitably used in semiconductor fabrication or the like can be produced. For applications where ozonized water preferably is used for ozone treatment, the thus-produced high-purity ozone-containing gas may be dissolved in high-purity water to prepare high-purity ozonized water, which may be used in these particular applications.

One embodiment of the ozone production method according to the present invention is explained below by reference to the accompanying drawing, but this embodiment should not be construed as limiting the method of the invention.

The FIGURE is a flowchart illustrating one embodiment of the ozone production method of the present invention.

To a storage tank 1 is fed low-purity starting material water such as tap water. The starting material water in the storage tank 1 is introduced, by means of a pump 2, into a high-purity water-producing device 3 of a cylindrical shape through a piping. In the high-purity water-producing device 3, impurities present in the water are removed by using an ion-exchange resin or other means, to produce high-purity water. This high-purity water is removed from the high-purity water-producing device 3 and the purity of the high-purity water is measured with an electrical conductivity meter 4 disposed in a piping through which the high-purity water flows from the high-purity water-producing device 3 to an electrolytic cell as described below. The piping having the electrical conductivity meter 4 branches into two pipes on the downstream side of the meter 4; one branch is connected to an ozone-containing gas separator 5 which is of a cylindrical shape and filled with a solution having almost the same composition as that of an anolyte for the electrolytic cell described below, and the other branch is connected to the storage tank 1. The piping extending to the ozone-containing gas separator 5 has a first valve 6, while the piping extending to the storage tank 1 has a second valve 7.

Where purity measurement for the high-purity raw water revealed that the purity of the water is not lower than a predetermined value, the first valve 6 is opened and the second valve 7 is closed thereby to feed the high-purity water to the ozone-containing gas separator 5. If, however, the purity of the high-purity water was found to be below the predetermined value, the first valve 6 is closed and the second valve 7 is opened, whereby the high-purity water is circulated to the storage tank 1 without being fed to the ozone-containing gas separator 5. Thus, water having a purity lower than a predetermined value is prevented from being introduced into the electrolytic cell, and, hence, contamination of the electrolytes or electrolytic cell parts with impurities present in such water is avoided. The piping having the first valve 6 may be connected not to the ozone-containing gas separator 5 but to the electrolytic cell described below.

The ozone-containing gas separator 5 is connected with the electrolytic cell 8 by pipings. This electrolytic cell 8 is partitioned into an anode chamber 12 and a cathode chamber 13 by means of a solid electrolyte 11 which is a fluororesin-type ion-exchange membrane such as a perfluorocarbonsulfonic acid-type ion-exchange membrane. The solid electrolyte 11 is covered on one side with an anode material 9, e.g., lead dioxide, and on the other side with a cathode material 10, e.g., platinum. In the anode chamber 12 to which the high-purity water is fed, an ozone-containing gas which is a mixture of ozone and oxygen is generated by hydrolysis.

The ozone-containing gas is circulated, as a gas-liquid mixture with the anolyte, to the ozone-containing gas separator 5, where the ozone-containing gas is separated from the liquid. The separated ozone-containing gas is removed from the ozone-containing gas separator 5 through a line 14, subsequently cooled with an ozone-containing gas cooler 15 disposed in the line 14 thereby to remove fluorine-containing substances and mist particles present in the gas, and then removed from the system. The anolyte separated from the gas is circulated back to the anode chamber 12. On the other hand, a catholyte in the electrolytic cell 8 is sent, as a gas-liquid mixture with hydrogen gas, through a piping to a hydrogen gas separator 16, where gas-liquid separation is conducted. Only the resulting catholyte from which the hydrogen gas has been removed is circulated back to the cathode chamber 13 in the electrolytic cell 8 by means of a pump 17.

According to the system illustrated in the FIGURE, fluorine-containing substances that contaminate the electrolytically generated ozone-containing gas due to the use of the fluororesin-type ion-exchange membrane 11 can be removed by cooling the gas with the ozone-containing gas cooler 15. Therefore, the ozone-containing gas removed from the system contains almost no fluorine-containing substances and, hence, can be used as a high-purity ozonecontaining gas for cleaning in the electronics industry and for other applications.

As described above, the method of producing ozone according to the present invention, which comprises electrolyzing water using a fluororesin-type ion-exchange membrane as a solid electrolyte thereby to generate an ozone-containing gas and, if desired and necessary, dissolving the gas in water to prepare ozonized water, is characterized in that the gas generated is passed through a cooler to remove fluorine-containing substances present in the gas.

In ozone production in which a fluororesin-type ion-exchange membrane is used as a solid electrolyte, fluorine-containing substances formed mainly due to the use of the fluororesin-type ion-exchange membrane contaminate the ozone-containing gas produced. The amount of such fluorine-containing substances present in the ozone-containing gas is so slight that use of the gas for ordinary ozone treatment, e.g., treatment of swimming-pool water, poses no problem. However, if such an ozone-containing gas is used for producing ultrapure water to be used in the electronics industry, the inclusion of fluorine-containing substances causes a serious problem. Some measure should, therefore, be taken to remove the fluorine-containing substances and, in addition, this removal must be attained by a simple method in order to reduce the ozone production cost. According to the present invention, the fluorine-containing substances can be removed by the very simple operation of cooling the ozone-containing gas generated. It is presumed that this efficient purification by the simple operation is because the fluorine-containing substances mainly comprises hydrogen fluoride and this hydrogen fluoride can be removed by liquefying it by cooling the ozone-containing gas containing the hydrogen fluoride gas. This cooling treatment also serves to diminish mist particles. As a result, a high-purity ozone-containing gas with almost no impurities can be obtained.

The cooling desirably is conducted at a cooling temperature of 25° C. or less. In particular, when the ozone-containing gas is cooled at 20° C. or a lower temperature, the fluorine-containing substances can be removed almost completely.

The present invention is further explained below by reference to the following example concerning production of an ozone-containing gas according to the method of the present invention. However, the example should not be construed as limiting the scope of the invention. Unless otherwise indicated herein, all parts, percents, ratios and the like are by weight.

EXAMPLE

Using the system shown in the FIGURE, an ozone-containing gas was produced as follows.

A perfluorocarbonsulfonic acid-type ion-exchange membrane (Nafion (trade name) 117 produced by Du Pont) having a length of 10 cm, a width of 10 cm, a thickness of 0.18 mm, and an ion-exchange capacity of 0.9 meq/g was used as a solid electrolyte, after one side of it was covered with $\beta$-lead dioxide as an anode material and the other side of it was covered with platinum as a cathode material, thus forming electrodes having an electrode area of 1 $dm^2$. Using this solid electrolyte, an electrolytic cell was partitioned into an anode chamber having a capacity of 100 $cm^3$ and a cathode chamber having a capacity of 200 $cm^3$. The anode material was connected with a porous feeder element made of titanium, while the cathode material was connected with a porous feeder element made of stainless steel. Next to the electrolytic cell, an ozone-containing gas separator was disposed which was in the form of a cylinder having a diameter of 5 cm and a height of 30 cm and which contained pure water.

Near the ozone-containing gas separator, there was disposed a high-purity raw water-producing device which was in the form of a cylinder having a diameter of 8 cm and a height of 50 cm and it was packed with an ion-exchange resin. This high-purity raw water-producing device was connected with a storage tank which had a capacity of 1 liter and in which tap water was stored as the starting material water. From this storage tank, the starting material water was fed to the high-purity water-producing device at a rate of 1 l/min. A direct current of 100 A was applied to the electrolytic cell, while the temperature of the anolyte was kept at 30° C. by cooling the outer wall of the anode chamber with water.

An ozone-containing gas cooler was disposed in an ozone-containing gas-withdrawal line extending from the ozone-containing gas separator. Cooling water was allowed to flow through the cooler, and an ozone-containing gas obtained through gas-liquid separation in the ozone-containing gas separator was sufficiently cooled by passing it through the cooler at a cooling water temperature of 5° C., 10° C., 15° C., 20° C., and 25° C. After the cooling treatment, the concentration of fluorine-containing substances in the ozone-containing gas was measured. The results obtained are shown in the Table below.

TABLE 1

| Cooling Temperature (°C.) | Fluorine-Containing Substance Concentration (μg/l-gas) |
| --- | --- |
| 5 | <0.005 |
| 10 | <0.005 |
| 15 | 0.01 |
| 20 | 0.05 |
| 25 | 0.8 |
| No cooling (30° C.) | 1.1 |

COMPARATIVE EXAMPLE

An ozone-containing gas was produced and the concentration of fluorine-containing substances therein was measured, in the same manner as in the Example except that the ozone-containing gas removed from the ozone-containing gas separator was not cooled with the cooler. The concentration value measured is also shown in the Table above.

The results shown in the Table above show that a considerable amount of fluorine-containing substances remain in the ozone-containing gas if the gas is not cooled, whereas cooling of the gas with 25° C. cooling water removes a large proportion of the fluorine-containing substances and cooling with cooling water of 20° C. or a lower temperature removes almost all the fluorine-containing substances.

While the invention has been described in detail and with reference to specific embodiments thereof, it will be apparent to one skilled in the art that various changes and modifications can be made therein without departing from the spirit and scope thereof.

What is claimed is:

1. A method for producing ozone which comprises electrolyzing water using a fluororesin ion-exchange membrane as a solid electrolyte thereby to generate an ozone-containing gas, and cooling the gas thereby to remove a fluorine-containing substance present in the gas generated to a concentration of at most 0.8 μg/l of gas, wherein said cooling is conducted at a temperature of 25° C. or less.

2. A method as claimed in claim 1, where said cooling is with a cooler.

* * * * *